W. & H. HOPKINS.
PROPULSION VEHICLE.
APPLICATION FILED OCT. 19, 1909.
968,355.
Patented Aug. 23, 1910.
2 SHEETS—SHEET 1.
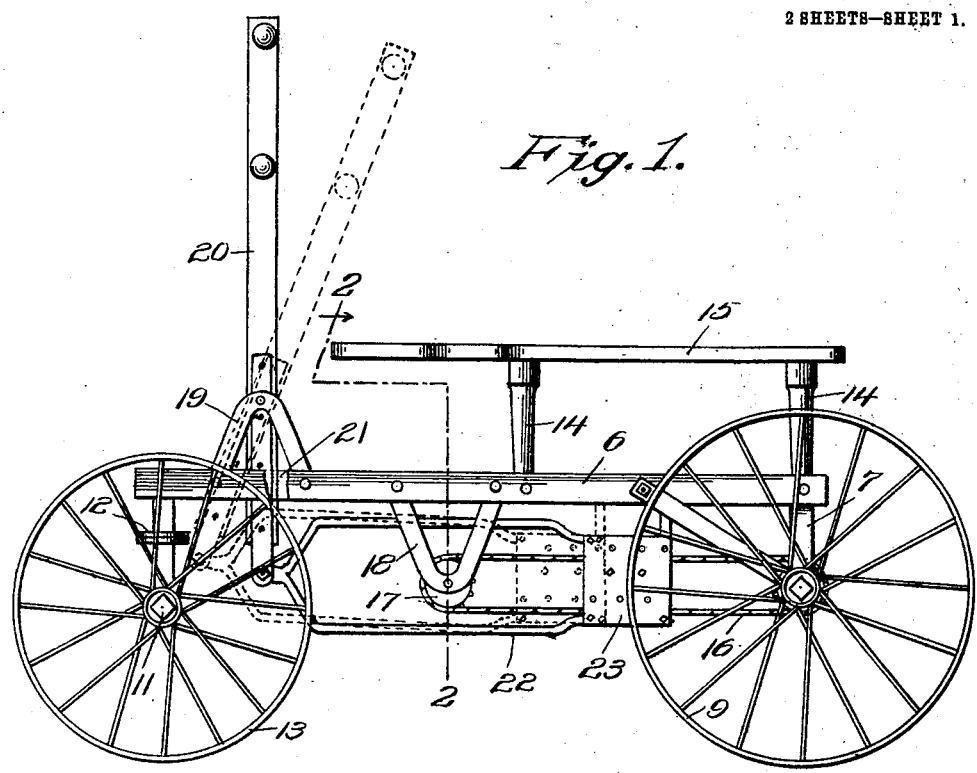
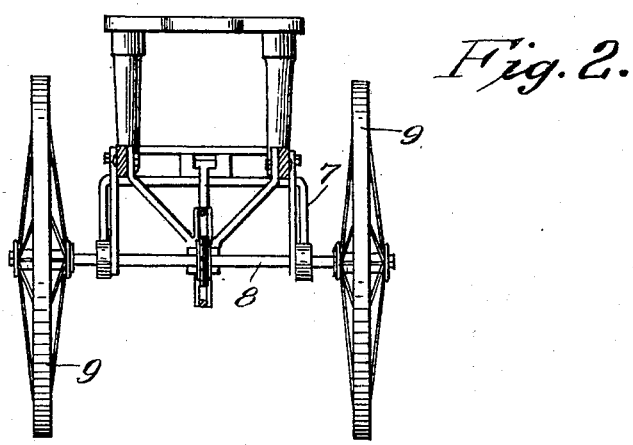
Witnesses
James F. Crown
Wm. Bagger
Inventors
William Hopkins.
Henry Hopkins.
By Victor J. Evans
Attorney W. & H. HOPKINS.
PROPULSION VEHICLE.
APPLICATION FILED OCT. 19, 1909.
968,355.
Patented Aug. 23, 1910.
2 SHEETS—SHEET 2.
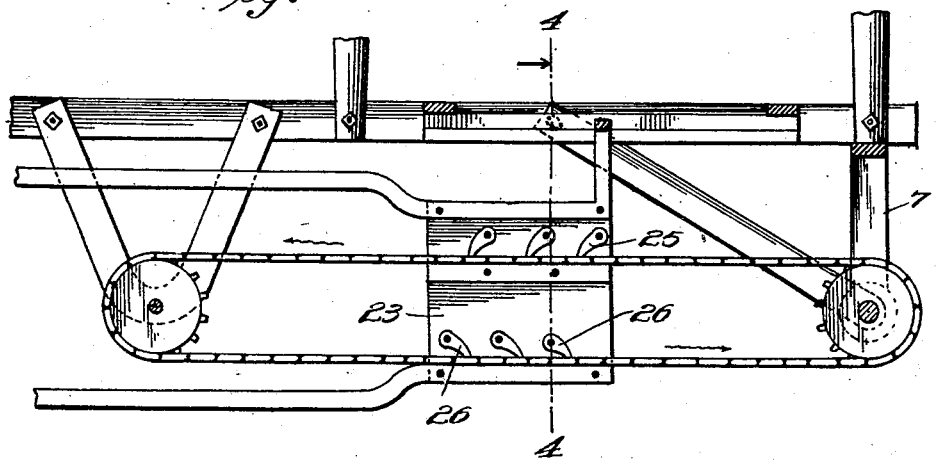
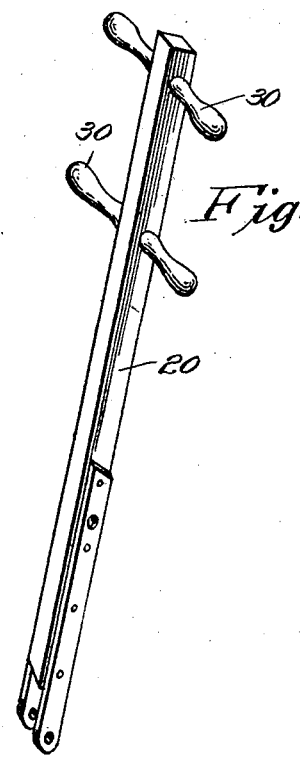
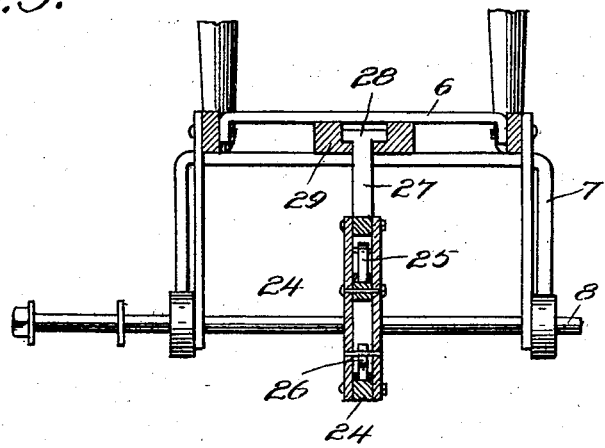
Witnesses
James F. Crown
Wm. Bagger
Inventors
William Hopkins.
Henry Hopkins.
By Victor J. Evans
Attorney

UNITED STATES PATENT OFFICE.

WILLIAM HOPKINS AND HENRY HOPKINS, OF OAKLAND, CALIFORNIA.

PROPULSION-VEHICLE.

968,355.  Specification of Letters Patent.  Patented Aug. 23, 1910.

Application filed October 19, 1909. Serial No. 523,426.

*To all whom it may concern:*

Be it known that we, WILLIAM HOPKINS and HENRY HOPKINS, citizens of the United States, residing at Oakland, in the county of Alameda and State of California, have invented new and useful Improvements in Propulsion-Vehicles, of which the following is a specification.

This invention relates to vehicles adapted to be propelled by hand power and it has for its objects to provide a propulsion vehicle of simple and improved construction which may be operated at a considerable rate of speed and which shall not be liable to become broken or injured while in motion.

A further object of the invention is to simplify and improve the propulsion mechanism for a vehicle of this class.

With these and other ends in view which will readily appear as the nature of the invention is better understood the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details therein exhibited, but that changes, alterations and modifications within the scope of the invention may be resorted to when desired.

In the drawings: Figure 1 is a side elevation of a vehicle constructed in accordance with the invention. Fig. 2 is a rear elevation of the same. Fig. 3 is a longitudinal vertical sectional view of a portion of the vehicle showing the propulsion mechanism; the side plate or cover of the pawl case having been removed. Fig. 4 is a vertical transverse sectional view taken on the plane indicated by the line 4—4 in Fig. 3. Fig. 5 is a perspective view of the operating lever detached.

Corresponding parts in the several figures are denoted by like characters of reference.

The vehicle bed 6 is provided with brackets 7 in which the rear axle 8 having the drive wheels 9 is supported for rotation; said axle being equipped with a sprocket wheel 10. The front or steering axle 11 is connected with the under side of the vehicle bed by means including the fifth wheel 12, said axle being provided with wheels 13. The vehicle bed is provided with posts or uprights 14 supporting a seat 15. A drive chain 16 connects the sprocket wheel 10 with a sprocket wheel 17; the latter being supported for rotation by means of a hanger 18 upon the underside of the vehicle bed. The sprocket wheels 10 and 17 are to be of equal diameter so that the upper and lower leads of the drive chain, when the latter is taut, will be preserved in parallel relation.

Suitably supported for oscillation by means of standards or brackets 19 upon the upper side of the vehicle bed is a hand lever 20 which projects downwardly through a slot 21 in the vehicle bed, the lower end of said lever being pivotally connected with the front end of a frame 22. Said frame carries adjacent to its rear end a casing 23 through which the leads of the drive chain 16 are guided, said chain being supported upon cleats 24 intermediate the side walls of the casing. Pawls 25 and 26 are pivotally supported between the side walls of the casing adjacent to the upper and lower leads of the chain respectively, said pawls being faced in opposite directions so as to engage the leads of the chain and operate the latter in such a manner as to cause the axle 8 to rotate and to propel the vehicle in a forward direction. The pawl case 23 is provided with an upwardly extending arm 27 having a cross piece 28 engaging a runway 29 upon the underside of the vehicle bed for the purpose of guiding and supporting the pawl case when the device is in operation and to prevent said case as well as the chain from sagging.

It will be obvious that anti-friction devices of any well known character may be used wherever necessary or desirable in the construction of this device for the purpose of insuring an easy and frictionless operation.

From the foregoing description taken in connection with the drawings hereto annexed, the operation and advantages of this invention will be readily understood. The operator mounted upon the seat 15, with his feet engaging the steering axle grasps the lever 20 which may be provided with cross bars or handles 30 and rocks or oscillates the same thus imparting a reciprocatory motion to the frame 22 and the pawl case 23. By the forward movement the pawls 25 will engage the upper lead of the chain while the lower lead passes idly under the pawls 26 which latter effectively engage the lower lead of the chain when the pawl case moves in a rearward direction when the upper lead of the chain will pass idly under the pawls 25, thus moving the chain in the direction indicated by arrows in Fig. 3 and propelling the vehicle at great speed and power, the power being continuously applied as long as the lever is oscillated.

This device as will be seen is very simple in construction and is capable of being manufactured at a very moderate expense. It is applicable to a variety of purposes which will readily suggest themselves to those skilled in the art.

It is desired to be understood that while a plurality of pawls have been shown in engagement with each lead of the chain, the number may be reduced or increased without departing from the invention.

Having thus described the invention, what is claimed is—

1. A vehicle having a rear axle supported for rotation, a sprocket wheel upon said axle, a sprocket wheel supported for rotation at a distance from the axle, a chain trained over the sprocket wheels, a casing supporting the leads of the chain, oppositely faced chain engaging pawls in said casing, and means for reciprocating the latter.

2. In a vehicle, an axle supported for rotation and carrying a sprocket wheel, a sprocket wheel supported for rotation at a distance from the axle, a chain trained over the sprocket wheels, a casing supporting the leads of the chain and having chain engaging pawls faced in opposite directions, means for supporting the casing and for guiding the same, and means for imparting a reciprocatory motion to the casing.

3. In a vehicle, an axle supported for rotation and having a sprocket wheel, a second sprocket wheel supported for rotation at a distance from the axle, a chain trained over the sprocket wheels, a casing supporting the leads of the chain, and having oppositely faced pawls engaging said chain leads, an arm extending upwardly from the casing, a runway for said arm, a frame connected with the casing, and a suitably supported lever pivotally connected with the frame.

4. A vehicle having a bed, an axle supported for rotation and carrying a sprocket wheel, a sprocket wheel supported for rotation at a distance from the axle, a chain trained over the sprocket wheels, a casing supporting the leads of the chain and having oppositely faced pawls engaging the chain leads, a runway upon the underside of the vehicle bed, an arm extending from the casing, and engaging said runway, a frame extending forwardly from the casing, and a lever supported above the vehicle bed extending through a slot, in the latter, and pivotally connected with the frame adjacent to the front end of the latter.

In testimony whereof we affix our signatures in presence of two witnesses.

WILLIAM HOPKINS.
HENRY HOPKINS.

Witnesses:
J. HAY SMITH,
P. M. BRUNER.